United States Patent
Klemen et al.

(10) Patent No.: US 7,104,917 B2
(45) Date of Patent: Sep. 12, 2006

(54) COUNTERSHAFT PLANETARY TRANSMISSIONS

(75) Inventors: Donald Klemen, Carmel, IN (US); Arthur Hall, III, Cicero, IN (US)

(73) Assignee: General Motors Corporation, Detroit, MI (US)

( * ) Notice: Subject to any disclaimer, the term of this patent is extended or adjusted under 35 U.S.C. 154(b) by 113 days.

(21) Appl. No.: 10/951,421

(22) Filed: Sep. 28, 2004

(65) Prior Publication Data

US 2006/0068964 A1 Mar. 30, 2006

(51) Int. Cl.
*F16H 3/44* (2006.01)
(52) U.S. Cl. .................... 475/302; 475/218; 475/329
(58) Field of Classification Search ............. 475/207, 475/209, 218, 302, 329
See application file for complete search history.

(56) References Cited

U.S. PATENT DOCUMENTS

| | | | |
|---|---|---|---|
| 5,310,390 A * | 5/1994 | Shirataki ............... 475/312 |
| 5,823,051 A * | 10/1998 | Hall, III .................. 74/325 |
| 5,971,883 A * | 10/1999 | Klemen ................. 475/296 |
| 6,066,062 A * | 5/2000 | Pigozzi .................. 475/207 |
| 2003/0040388 A1* | 2/2003 | Sakamoto et al. ......... 475/117 |

FOREIGN PATENT DOCUMENTS

JP 02225844 A * 9/1990

* cited by examiner

*Primary Examiner*—Rodney H. Bonck
*Assistant Examiner*—David D. Le
(74) *Attorney, Agent, or Firm*—Christopher DeVries

(57) ABSTRACT

A multi-speed power transmission includes a countershaft portion and a planetary gearset portion. The countershaft portion is controlled by synchronizer torque-transmitting mechanisms, and the planetary gearset portion is controlled by selectively engageable friction-type torque-transmitting mechanisms. The selective operation of these torque-transmitting mechanisms permit eight forward speed ratios and three reverse speed ratios.

5 Claims, 3 Drawing Sheets

US 7,104,917 B2

COUNTERSHAFT PLANETARY TRANSMISSIONS

TECHNICAL FIELD

This invention relates to power transmissions and, more particularly, to power transmissions combining a countershaft arrangement and a planetary gear arrangement.

BACKGROUND OF THE INVENTION

Today's vehicles have powertrains that are seeking an increased number of speed ratios within the power transmission. Historically, these transmissions have had speeds ranging from two to six forward speed ratios. The transmissions employing two through five forward speed ratios have been automatic shifting planetary gear power transmissions, while transmissions providing two through six forward speed ratios have been countershaft-type transmissions. In heavy trucks, of course, there are more speed ratios available than six, many of which go as high as twenty with a large number of gear members to provide those ratios.

In planetary transmissions, two through four speeds can generally be found with two planetary gearsets and a plurality of torque-transmitting mechanisms. Five-, six-, and seven-speed power transmissions can generally be provided using three planetary gearsets and four through seven torque-transmitting mechanisms. Eight-speed planetary transmissions have been proposed using four planetary gearsets and seven torque-transmitting mechanisms.

Multi-speed countershaft transmissions generally include a synchronizer clutch or mechanical clutch for each of the forward speed ratios and one for reverse. While the forward speed ratio synchronizer clutches can generally be coupled to be double acting, it still requires a number of mechanisms to provide the speed ratios within a power transmission. For example, a four-speed countershaft transmission would require two double synchronizers for the four forward speeds and one half synchronizer or single synchronizer for the reverse speed. Thus, a great deal of mechanical devices are needed within a power transmission to provide the forward speeds required.

SUMMARY OF THE INVENTION

It is an object of the present invention to provide an improved multi-speed power transmission incorporating a countershaft group and a planetary group.

In one aspect of the present invention, a countershaft portion is provided with four sets of ratio gears.

In another aspect of the present invention, a single planetary gearset of either the single pinion or double pinion type is provided.

In yet another aspect of the present invention, the countershaft portion of the transmission is controlled by synchronizer clutches and the planetary portion is controlled by selectively engageable torque-transmitting mechanisms of the friction type.

In a further aspect of the present invention, the countershaft transmission has a first and second ratio, which are controlled by a double acting synchronizer mechanism while the third and fourth ratio gears are controlled by single synchronizer mechanisms.

In yet a further aspect of the present invention, the planetary transmission is controlled by two stationary-type torque-transmitting mechanisms and one rotating-type torque-transmitting mechanism.

In still a further aspect of the present invention, the transmission provides eight forward speed ratios and three reverse speed ratios through selective actuation of the synchronizer mechanisms and the torque-transmitting mechanisms.

DESCRIPTION OF THE EXEMPLARY EMBODIMENTS

Figures 1, 2:
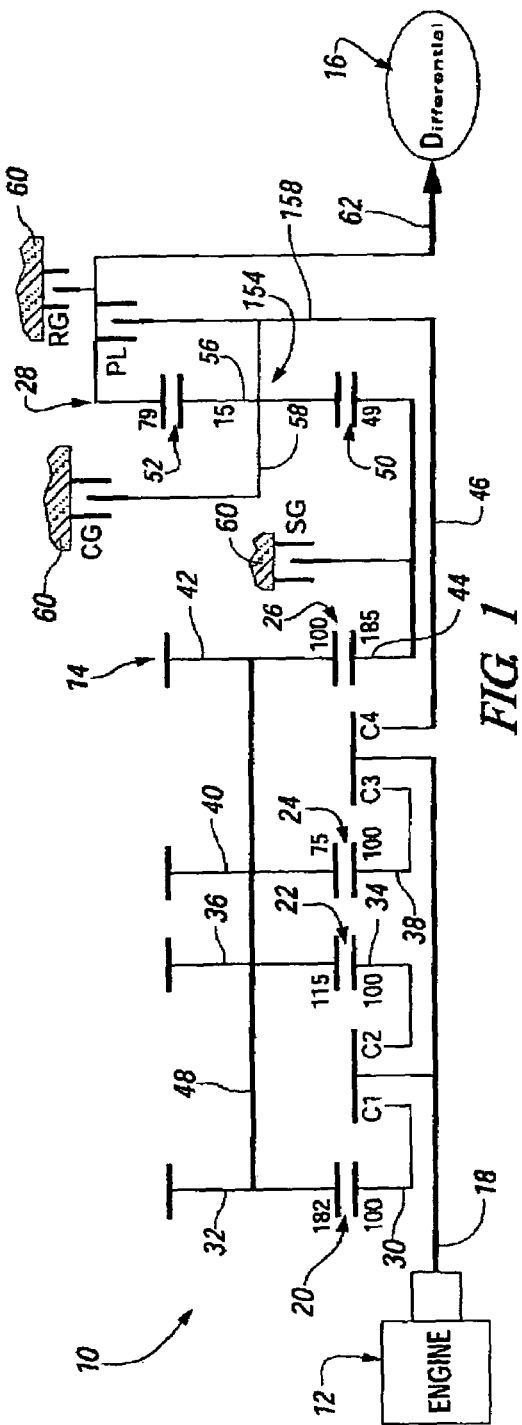
FIG. 1 is a schematic representation of a powertrain having a power transmission incorporating one embodiment of the present invention.
FIG. 2 is a table describing the engagement sequence of the torque-transmitting mechanisms and the gear ratios that are available as well as the step ratios between forward speed ratios.

Referring to the drawings, wherein like characters represent the same or corresponding parts throughout the several views, there is seen in FIG. 1 a powertrain 10 including a conventional internal combustion engine and manual clutch 12, a multi-speed power transmission 14, and a conventional differential mechanism 16.

The transmission 14 has an input shaft 18 connected with the engine and clutch 12, three ratio gearsets 20, 22, and 24, an output gearset 26, and a planetary gearset 28. The ratio gearset 20 has an input gear 30 and an output gear 32. The ratio gearset 22 has an input gear or ratio gear 34 and an output gear or ratio gear 36. The ratio gearset 24 has an input gear or ratio gear 38 and an output gear or ratio gear 40. The output gearset 26 has an input gear or ratio gear 42 and an output gear or ratio gear 44. The input gears 30, 34, and 38 are rotatably supported on the input shaft 18 and the output gear 44 is rotatably mounted on a transfer shaft 46.

Four synchronizer torque-transmitting mechanism elements C1, C2, C3, and C4 are operatively connected with the input shaft 18. The synchronizer torque-transmitting mechanism C1 is selectively engageable to connect the input gear 30 with the input shaft 18, the synchronizer torque-transmitting mechanism C2 is operable to connect the input shaft 18 with the input gear 34, and the synchronizer torque-transmitting mechanism C3 is operable to connect the input shaft 18 with the input gear 38. The synchronizer torque-transmitting mechanism C4 is operable to connect the input shaft 18 with the transfer shaft 46. The output gears 32, 36, and 40 and the input gear 42 are fixedly secured with a countershaft 48.

The planetary gearset 28 includes a sun gear member 50, a ring gear member 52, and a planet carrier assembly member 54, which includes a plurality of pinion gears 56 rotatably mounted on a planet carrier member 58. The planet carrier member 58 is continuously connected with the transfer shaft 46, such that engagement of the synchronizer torque-transmitting mechanism C4 provides a drive connection between the input shaft 18 and the planet carrier member 58.

The sun gear member 50 is selectively connected with a stationary component or housing 60 through a torque-transmitting mechanism SG. The planet carrier member 58 is selectively connectible with the housing 60 through a selectively engageable torque-transmitting mechanism CG and selectively connectible with the ring gear member 52 to a selectively engageable torque-transmitting mechanism PL. The ring gear member 52 is continuously connected with an output shaft 62, which is continuously drivingly connected with the differential 16. Thus, the engagement of the torque-transmitting mechanism SG will hold the sun gear member 50 stationary, selective engagement of the torque-transmitting mechanism CG will hold the planet carrier member 58 stationary, and selective engagement of the torque-transmitting mechanism PL will connect the planet carrier member 58 with the ring gear member 52 and therefore the output shaft 62. A park device RG is provided, which will connect the ring gear member 52 and therefore the output shaft 62 with the stationary member 60 when it is desired to hold the vehicle stationary.

The synchronizer torque-transmitting mechanisms C1 and C2 may be one-way synchronizers or two-way synchronizers, both of which are conventional devices. The synchronizer torque-transmitting mechanisms C3 and C4 may both be one-way synchronizers, which are conventional, or may be constructed in accordance with the more sophisticated devices shown U.S. Ser. No. 10/717,320, filed Nov. 19, 2003, and assigned to the assignee of the present invention. The devices shown in that patent application are three-way and four-way synchronizers, which would permit separate engagement of C3 and C4 as well as joint engagement of C3 and C4.

The selective engagement of the synchronizer torque-transmitting mechanisms C1, C2, C3, and C4, and the planetary controlled torque-transmitting mechanisms SG, CG, and PL are employed in combinations of two to establish eight forward speed ratios and three reverse speed ratios between the input shaft 18 and the output shaft 62.

The first and lowest reverse speed ratio is established with the engagement of the synchronizer torque-transmitting mechanism C1 and the torque-transmitting mechanism CG. With the engagement of the synchronizer torque-transmitting mechanism C1, the countershaft 48 is rotated at a speed determined by the ratio between the ratio gears 30, 32, the sun gear member 50 is rotated at a speed determined by the ratio between the output gears 42 and 44. The planetary gearset 28 establishes a reverse speed ratio with the engagement of the synchronizer torque-transmitting mechanism CG thereby holding the planet carrier member 58 stationary. Thus, the ring gear member 52 and the output shaft 62 are rotated in the reverse direction, that is, the direction opposite to the rotation of the input shaft 18.

The second reverse speed ratio R2 is established with the engagement of the synchronizer torque-transmitting mechanism C2 and simultaneous release of the synchronizer torque-transmitting mechanism C1, such that the input shaft speed is transferred to the countershaft 48 through the ratio gears 34 and 36 and then through the output gear set 26 and the planetary gearset 28 in a manner similar to first reverse speed ratio. The third reverse speed ratio R3 is established with the simultaneous disengagement of the synchronizer torque-transmitting mechanism C2 and the engagement of the synchronizer torque-transmitting mechanism C3, thereby creating a ratio between the input shaft 18 and the countershaft 48, which is determined by the ratio of the gears 38 and 40. The output of the countershaft 48 is the same for the third reverse speed ratio as it is for the first and second reverse speed ratio.

The engagement sequence and ratio values are given in FIG. 2. These ratio values are determined numerically by the ratio numbers of the various gear components. As an example only, the ratio between the gears 30 and 32 is 1.82, that is, the gear 30 will rotate 1.82 times faster than the gear 32. The ratio between the gears 34 and 36 is 1.15, and the ratio between the gears 38 and 40 is 0.75. The ratio between the gears 42 and 44 is 1.85, that is, the gear 42 will rotate 1.85 times as fast as the gear 44.

The ring gear/sun gear ratio of the planetary gearset 28 is 1.61, which will establish the ratios within the planetary gearset depending upon the torque-transmitting mechanism engaged. The ratio numbers given in FIG. 2, for example R1, which is equal to −5.428, signifies that the input shaft 18 will rotate 5.428 times for each rotation of the output shaft 62. All three of the reverse speed ratios are therefore underdrive ratios, meaning that the output rotates at a slower speed than the input.

The first forward speed ratio is established with the engagement of the torque-transmitting mechanism PL and the synchronizer torque-transmitting mechanism C1. The torque-transmitting mechanism PL puts the planetary gearset 28 in a 1:1 condition, and therefore the ratio between the input shaft 18 and the output shaft 62 is determined by the ratio of the gearset 20 and the gearset 26.

The second forward speed ratio is determined by interchanging the synchronizer torque transmitting mechanisms C1, C2, thereby changing the ratio between the input shaft 18 and the countershaft 48, such that the second forward speed ratio is determined by the ratios of the gearsets 22 and 26.

The third forward speed ratio is established with the simultaneous interchange of the synchronizer torque-transmitting mechanisms C3 and C2, such that the third forward speed ratio is determined by the ratio of the gearsets 24 and 26. Each of the interchanges of the synchronizer torque-transmitting mechanisms C1, C2, C3, and C4 is accompanied by the engagement and disengagement of the clutch portion of the engine and clutch 12. The clutch combined with the engine 12 is a conventional friction clutch mechanism that may be manually or automatically operated.

The fourth forward speed ratio is established with the interchange of the synchronizer torque-transmitting mechanisms C3 and C4, which provides a direct connection between the input shaft 18 and the output shaft 62.

The fifth forward speed ratio is established with the simultaneous engagement of the synchronizer torque-transmitting mechanisms C3 and C4, and the disengagement of the torque-transmitting mechanism PL. With this gear combination, the countershaft 48 and therefore the sun gear member 50 is rotated at a speed determined by the ratios of the gearsets 24 and 26. With the engagement of the synchronizer torque-transmitting mechanism C4, the planet carrier member 58 is rotated at the speed of the input shaft 18, thereby producing an overdrive ratio within the planetary gearset 28, such that the ring gear member 52 and therefore the output shaft 62 will rotate at a speed greater than the speed of the input shaft 18.

The sixth forward speed ratio is established with the engagement of the synchronizer torque-transmitting mechanisms C4 and C2. Thus, the synchronizer torque-transmitting mechanisms C3 and C2 are interchanged during this ratio shift. The engagement of the synchronizer torque-transmitting mechanism C2 and therefore the ratio of the gearset 22 provide for the countershaft 48 to rotate at a slower speed than that established by engagement of the synchronizer torque-transmitting mechanism C3. Thus, the sun gear member 50 will rotate forward at a slower speed while the planet carrier member 58 remains rotating at the speed of the input shaft 18, thus resulting in a higher output speed due to the overdrive ratio that is established within the planetary gearset 28.

The seventh forward speed ratio is established with the engagement of the synchronizer torque-transmitting mechanism C4 and the interchange of the synchronizer torque-transmitting mechanisms C2, C1, resulting in a slower rotation of the countershaft 48 and therefore a higher overdrive at the output shaft 62.

The eighth forward speed ratio is established by the disengagement of the synchronizer torque-transmitting mechanism C1 and the simultaneous engagement of the torque-transmitting mechanism SG. The torque-transmitting mechanism SG will hold the sun gear member 50 stationary while the planet carrier member 58 is driven directly by the input shaft 18 resulting in even more overdrive ratio at the output shaft 62.

Also shown in FIG. 2 are the steps between adjacent forward speed ratios. For example, the step between first and second forward is 1.58. It will be noted that the step ratios between some of the overdrive ratios, for example, between forward sixth speed and forward seventh speed, is only 1.08. Should the operator desire a different performance curve by changing the step ratio, the fifth forward speed ratio and seventh forward speed ratio can be skipped, such that the step ratio between fourth and sixth will be 1.33 and the step between sixth and eighth would be 1.22. Controls to provide this are well known in the art. The operator, if manually controlling the synchronizer torque transmitting mechanisms, can do a skip shift when only a synchronizer interchange is involved as exists during the first through seventh speeds. Automatic skip shifting is also possible.

Figures 3, 4:
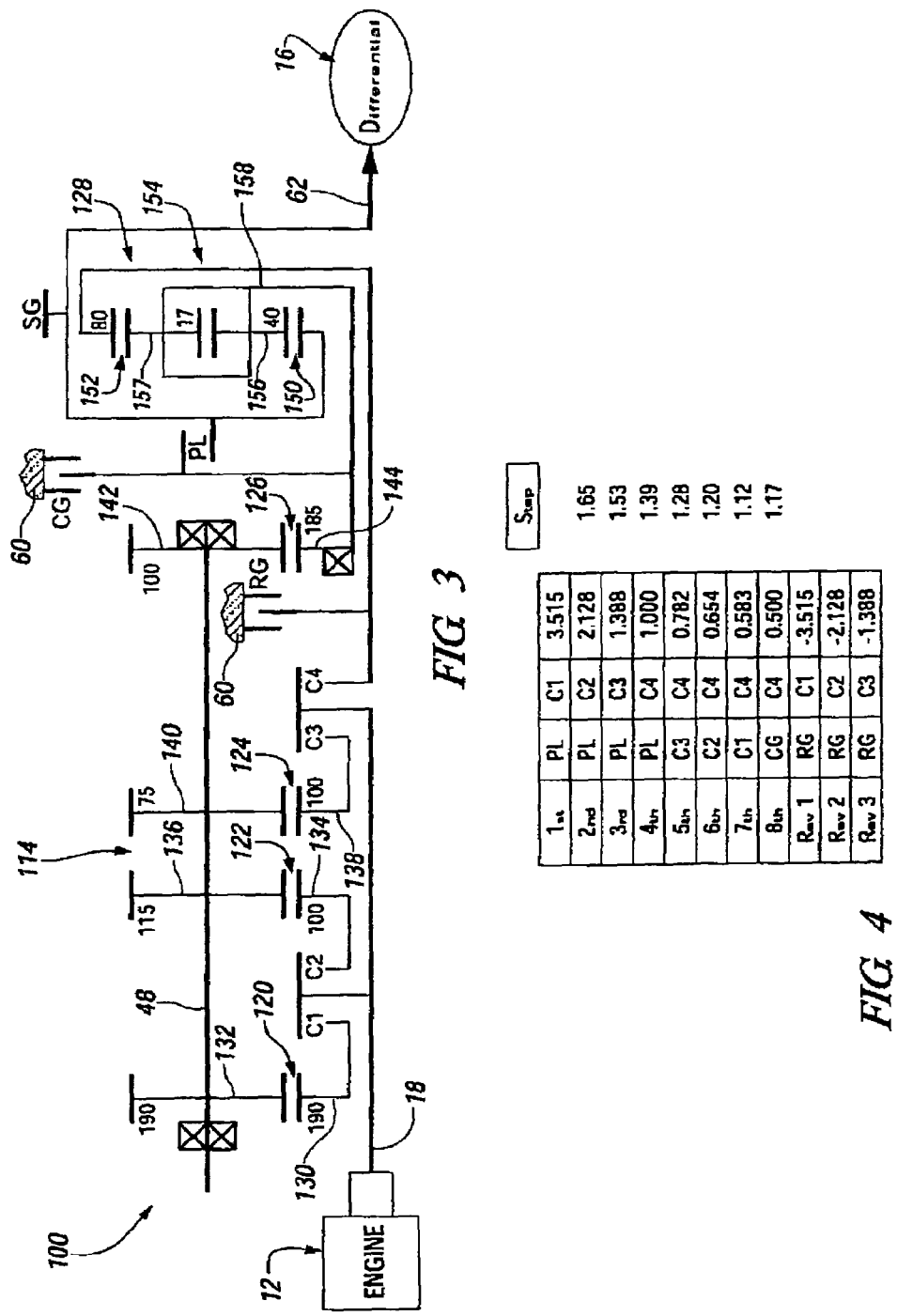
FIG. 3 is a schematic representation of a powertrain similar to that shown in FIG. 1 incorporating another embodiment of the present invention.
FIG. 4 is a table similar to FIG. 2 describing the engagement sequence of the torque-transmitting mechanisms as well as gear ratios and step ratios for the transmission shown in FIG. 3.

A powertrain 100 is shown in FIG. 3. The powertrain 100 includes the engine and clutch 12, the differential output 16 and a multi-speed transmission 114. The multi-speed transmission includes three ratio gearsets 120, 122, and 124, and an output gearset 126. Also included within the multi-speed transmission 114 is a planetary gearset 128, which includes a sun gear member 150, a ring gear member 152, a planet carrier assembly member 154, which has a plurality of pairs of meshing pinion gears 156 and 157, which are rotatably mounted on a planet carrier member 158 and disposed in meshing relationship with the sun gear member 150 and the ring gear member 152, respectively.

The planetary gearset 128 is known as a double-pinion or compound-pinion planetary gearset. With these types of planetary gears, the sun gear member and ring gear member will rotate in the same direction when the carrier is held stationary. If the ring gear member is held stationary and the planet carrier is rotated, the sun gear member will rotate in a direction opposite to the rotation of the carrier.

The sun gear member 150 is continuously connected with the transmission output shaft 62. The ring gear member 152 is connected with the synchronizer torque-transmitting mechanism C4 and with a selectively engageable torque-transmitting mechanism RG, which is connected with the transmission housing 60. The torque-transmitting mechanism RG is therefore a stationary-type torque-transmitting mechanism, commonly termed a brake. The planet carrier member 158 is selectively engageable with the housing 60 through the torque-transmitting mechanism CG and selectively interconnectible with the sun gear member 150 through a conventional selectively engageable torque-transmitting mechanism PL. A further connection with the planet carrier member 158 is through the output gearset 126.

The ratio gearset 120 includes the meshing gears 130 and 132, the ratio gearset 122 includes the meshing gears 134 and 136, the ratio gearset 124 includes the meshing gears 138 and 140, and the output gearset 126 includes the meshing gears 142 and 144.

As with the transmission 14 described above in FIG. 1, the synchronizer torque-transmitting mechanisms C1, C2, and C3 are effective to connect the input shaft 18 to the countershaft 48. The major difference between the transmission shown in FIG. 1 and that shown in FIG. 3 is the arrangement of the planetary gearset 128.

The table of FIG. 4 describes the engagement sequence of the torque-transmitting mechanisms C1, C2, C3, C4, RG, CG, and P1. The ratio between the gears 130 and 132 is 1.9, the ratio between the gears 134 and 136 is 1.15, the ratio between the gears 138 and 140 is 0.75, and the ratio between the gears 142 and 144 is 1.85. These numbers, of course, are given by way of example only. The ring gear/sun gear ratio for the planetary gearset 128 is 2.00.

As can be seen in FIG. 4, the step ratios between adjacent forward speed ratios are sequenced differently than those of FIG. 1, which is a result of choosing different gear ratios within the countershaft portion of the transmission and the planetary portion of the transmission.

It will be noted that the first reverse speed ratio and the first forward speed ratio are equal. This is desirable in some transmissions depending upon the vehicle in which the transmission is installed.

Figures 5, 6:
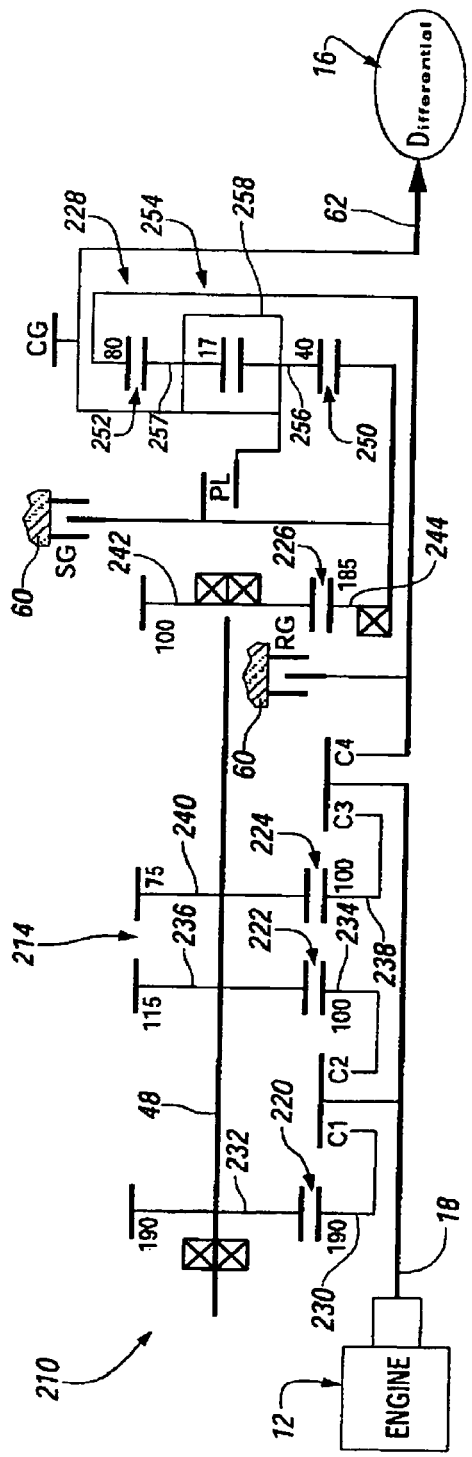
FIG. 5 is a schematic representation of a powertrain having a power transmission incorporating another embodiment of the present invention.
FIG. 6 is a table similar to FIGS. 2 and 4 describing the engagement sequence of the torque-transmitting mechanisms as well as the gear ratios and step ratios provided thereby.

A powertrain 210 is shown in FIG. 5. The powertrain 210 includes the engine and clutch 12, the output differential 16, and a multi-speed transmission 214. The multi-speed transmission 214 includes a countershaft section having three ratio gearsets 220, 222, and 224 and an output gearset 226. The transmission 214 also includes a double-pinion planetary gearset 228, which is similar in construction to the planetary gearset 128 with the exception that a planet carrier 258 is continuously connected with the output shaft 62, a ring gear member 252 is connected with the synchronizer torque-transmitting mechanism C4, and a sun gear member 250 is connected with the output gearset 226.

The ratio gearset 220 is controlled by the synchronizer torque-transmitting mechanism C1. The ratio gearset 222 is controlled by the synchronizer torque-transmitting mechanism C2. The ratio gearset 224 is controlled by the synchronizer torque-transmitting mechanism C3. Each of these torque-transmitting mechanisms is effective to connect their respective ratio gearsets with the input shaft 18.

The planetary gearset 228 includes the sun gear member 250, the ring gear member 252, and the planet carrier assembly member 254, which has incorporated therein a plurality of pairs of meshing pinion gears 256 and 257 rotatably supported on a planet carrier member 258. As previously mentioned, the planet carrier member 258 is connected continuously with the output shaft 62 and is selectively connectible with the sun gear member 250 through the selectively engageable torque-transmitting mechanism PL. The sun gear member 250 is also selectively connectible with the transmission housing 60. The ring gear member 252 is selectively connected with the transmission housing 60 through the torque-transmitting mechanism RG, and, as previously mentioned, with the synchronizer torque-transmitting mechanism C4.

The gear ratio between gears 230 and 232 is 1.50, the gear ratio between gears 234 and 236 is 0.981, and the gear ratio between gears 238 and 240 is 0.666. The gear ratio between gears 242 and 244 is 2.0 and the ring gear/sun gear ratio of the planetary gearset 228 is 2.19. As mentioned above, these numbers are given by way of example and are not considered limiting for this invention.

The table of FIG. 6 describes the engagement of the torque-transmitting mechanisms and the ratios, which are established thereby with the given gear ratio numbers. FIG. 6 also describes the step ratio between adjacent forward speed ratios.

In each of the embodiments shown in FIGS. 1, 3 and 5, it will be appreciated that the countershaft 48 increases in speed with the progression of the first three forward speed ratios. The countershaft 48 is not included in the fourth forward speed ratio, which is a direct drive, and the countershaft 48 is decreased in speed during the establishment of the ratios five, six, and seven. The countershaft is held stationary during the eighth forward speed ratio, which is the highest overdrive ratio. Thus, if a vehicle is driven at higher speeds in the eighth forward speed ratio, the countershaft and the gears associated therewith are held stationary, reducing the losses considerably. During the first four forward speed ratios, the planetary gearsets of the transmissions described is rotated as a single unit, thereby reducing the spin and gear losses occasioned with the planetary action.

Also by combining the planetary gearset and the countershaft gearset, it is not necessary to provide a separate reverse idler gear set thereby compacting the overall size of the transmission. If desired, it is possible to use two countershafts thereby reducing the loads on the main shaft, which is the input shaft 18. This, of course, would make for a slightly larger transmission; however, depending on the engine power, which is to be developed, it might be more satisfactory to provide two countershafts thereby reducing the main shaft loading. The countershafts, as can be determined from the above descriptions, can be formed as single pieces.

The ratio changes are simple in that during the first four forward speed ratios the ratio changes are all made with the planetary gearset in a 1:1 condition, and the fifth through eighth speed ratios are all made with the synchronizer torque-transmitting mechanism C4 engaged and the planetary gearset providing a combiner. This permits synchronizer interchanges for the first through fourth speeds and also synchronizer interchanges for fifth through seventh and a synchronizer-to-friction device change for eighth forward speed. During the first through fourth ratios, the synchronizers are stepped from C1 to C4, and during the fifth through seventh, the synchronizers are stepped from C3 to C1.

The invention claimed is:

1. A power transmission comprising:
    a countershaft portion;
    a planetary gearset portion;
    an input shaft;
    an output shaft;
    said countershaft portion including a plurality of ratio gearsets connectible with said input shaft by a plurality of selectively engageable mechanical torque-transmitting mechanisms, and an output gearset connectible with a first member of said planetary gearset;
    a second member of said planetary gearset being selectively connectible with said input shaft through a selectively engageable input torque-transmitting mechanism;
    said planetary gearset including a third member continuously connected with said output shaft;
    a first torque-transmitting mechanism selectively interconnecting said first and third members of said planetary gearset;
    a second selectively engageable torque-transmitting mechanism interconnecting said first member of said planetary gearset with a transmission housing; and
    a third selectively engageable torque-transmitting mechanism selectively interconnecting said second member of said planetary gearset with said transmission housing.

2. The power transmission defined in claim 1, further comprising:
    at least three ratio gearsets respectively controlled by three of said mechanical torque-transmitting mechanisms, which are engaged in a manner to provide an increase in speed ratio between said input shaft and a countershaft, which is drivingly connected continuously with said output gearset during at least three forward speed ratios and being engaged to provide sequentially reduced speeds between said input shaft and said countershaft during at least three further forward speed ratios.

3. The power transmission defined in claim 1, further wherein:
    said first member of said planetary gearset is held stationary and said second member of said planetary gearset is connected directly with said input shaft to provide at least one forward speed ratio.

4. The power transmission defined in claim 1, further wherein:
    said input torque-transmitting mechanism and said first torque-transmitting mechanism are simultaneously engaged to establish a direct drive between said input shaft and said output shaft.

5. The power transmission defined in claim 1, further wherein:
    said input torque-transmitting mechanism and respective ones of said mechanical torque-transmitting mechanisms are engaged in combination to establish at least three overdrive ratios.

* * * * *